(12) United States Patent
McFarland et al.

(10) Patent No.: US 9,617,884 B2
(45) Date of Patent: Apr. 11, 2017

(54) LIQUID COOLED REDUCTANT DOSING UNIT

(71) Applicant: Continental Automotive Systems, Inc., Auburn Hills, MI (US)

(72) Inventors: Robert Wayne McFarland, Smithfield, VA (US); Keith Aaron Shaw, Yorktown, VA (US); Michael J. Hornby, Williamsburg, VA (US); James A. Wynn, Virgina Beach, VA (US); Joshua Lee Hatfield, Poquoson, VA (US); Christopher Caulkins, Virginia Beach, VA (US); Stephen C. Bugos, Poquoson, VA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 43 days.

(21) Appl. No.: 14/490,083

(22) Filed: Sep. 18, 2014

(65) Prior Publication Data

US 2016/0084129 A1    Mar. 24, 2016

(51) Int. Cl.
*F02M 53/04* (2006.01)
*F01N 3/04* (2006.01)
(Continued)

(52) U.S. Cl.
CPC ............ *F01N 3/046* (2013.01); *F01N 3/108* (2013.01); *F01N 3/2066* (2013.01); *F01N 3/2073* (2013.01); *F01N 2610/02* (2013.01); *F01N 2610/06* (2013.01); *F01N 2610/1453* (2013.01); *F01N 2610/1486* (2013.01)

(58) Field of Classification Search
CPC ........... F01N 2260/02; F01N 2260/022; F01N 2260/024; F01N 2610/10; F01N 2260/11; F01N 2260/1486; F02M 53/04; F02M 53/043; F02M 53/046; F02M 53/08; F02M 2700/077
See application file for complete search history.

(56) References Cited

U.S. PATENT DOCUMENTS

| 2012/0110990 A1 | 5/2012 | Stein et al. |
| 2014/0305104 A1* | 10/2014 | Knittel .................. F01N 3/2066 60/295 |
| 2015/0059320 A1 | 3/2015 | Winkler et al. |

FOREIGN PATENT DOCUMENTS

| DE | 102009047375 A1 | 6/2011 |
| DE | 102011075591 A1 * | 11/2012 ........... F01N 3/0253 |

(Continued)

OTHER PUBLICATIONS

Machine translation of DE 102011075591 A1, accessed on Jun. 29, 2016.*

(Continued)

*Primary Examiner* — Jonathan Matthias

(57) ABSTRACT

A liquid cooled reduction unit includes a diesel exhaust fluid (DEF) injection valve. The valve includes an end portion extending to a distal end. The valve is configured to receive a DEF and force the DEF to exit at the distal end such that the DEF is then directed and applied to an exhaust stream of a vehicle engine. A coolant jacket is selectively filled with a coolant and has an outer side and an inner side. The inner side of the jacket faces a length of the end portion and is separated from the length of the end portion by an air gap.

14 Claims, 3 Drawing Sheets

(51) Int. Cl.
*F01N 3/10* (2006.01)
*F01N 3/20* (2006.01)

(56) References Cited

FOREIGN PATENT DOCUMENTS

| DE | WO 2013076028 A1 * | 5/2013 | ........... F01N 3/2066 |
|----|--------------------|--------|-------------------------|
| JP | 2013-500427 | 1/2013 | |
| WO | 2013/076028 A1 | 5/2013 | |
| WO | 2013-149759 | 10/2013 | |

OTHER PUBLICATIONS

Korean Intellectual Property Office, Office Action for Korean counterpart application 10-2015-0130588, dated Feb. 16, 2017.
Japan Patent Office, Decision to Grant a Patent for counterpart JP application 2015-183970, Jan. 16, 2017.

* cited by examiner

LIQUID COOLED REDUCTANT DOSING UNIT

TECHNICAL FIELD

This application relates generally to exhaust systems and, more specifically, to cooling of exhaust systems.

BACKGROUND OF THE INVENTION

Stringent emissions standards in Europe and North America are requiring automakers to reduce emissions produced by vehicles. Various technologies have been developed to reduce these emissions.

For instance, some diesel engines exhibit high levels of nitrogen oxide (NOx) emissions. Selective catalytic reduction (SCR) approaches have been used to convert nitrogen oxides into nitrogen, $N_2$, and water, $H_2O$.

In SCR approaches, a reduction delivery unit (RDU) is used to inject a Diesel Exhaust Fluid (DEF) reductant into the exhaust stream of an engine. For example, urea is added to the exhaust gas stream by the RDU and various byproducts such as carbon dioxide and water are formed. Ammonia is a desired bi-product and in conjunction with a catalyst converts the nitrogen oxide (NOx) into harmless water and nitrogen.

The RDU has a DEF injector that is in some cases liquid cooled by a liquid jacket. A hot soak condition occurs when the vehicle is running but is then turned off and no liquid coolant is flowing through the jacket. During hot soak conditions, the heat of the exhaust system is conducted into the RDU. Where the vehicle is run at a high load then turned off, this hot soak can boil the coolant creating unrestricted temperatures within the RDU and subsequent over temping of DEF within the injector. When the DEF is over-temped, it forms hard insoluable byproducts that negatively affect the performance of the DEF injector.

DEF also freezes at a higher temperature than the coolant. In such circumstances, a warmed urea could be frozen during its travel through a DEF injector when intimate contact exists between the jacket and the body of the valve, and where the coolant temperature is below the freezing point of DEF.

To the extent these problems have even been addressed, the above-mentioned problems have been addressed inadequately by previous approaches. Consequently, some user dissatisfaction has been created.

BRIEF DESCRIPTION OF THE DRAWINGS

For a more complete understanding of the disclosure, reference should be made to the following detailed description and accompanying drawings wherein.

Figure 2:
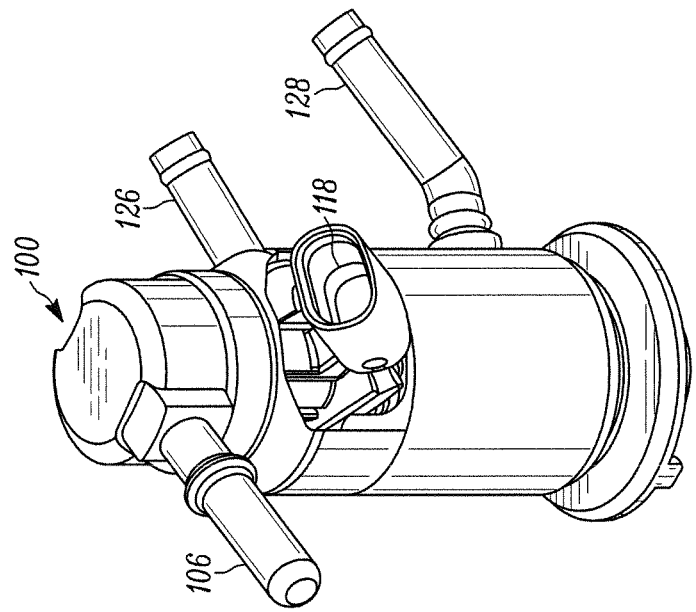
FIG. 2 comprises an isometric of a liquid cooled RDU according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

The present approaches increase a liquid cooled RDU injector's ability to resist boiling and freezing diesel exhaust fuel (DEF) by isolating the DEF injector from the coolant jacket. The present approaches uses non-intimate contact (e.g., as provided by an air gap) between the injector and the coolant jacket to allow the injector to remain isolated from the coolant jacket during temperature excursions.

In one example and during hot soak conditions, the DEF in the injector is not overheated. In other circumstances when the temperature is cold enough to cause the coolant temperature to be below the freezing point of the DEF within the coolant jacket, the non-intimate contact prevents the freezing of the DEF as it passes through the DEF valve.

In many of these embodiments, a liquid cooled reduction unit includes a diesel exhaust fluid (DEF) injection valve. The valve includes an end portion extending to a distal end. The valve is configured to receive a DEF and force the DEF to exit at the distal end such that the DEF is then being directed and applied to an exhaust stream of a vehicle engine.

A coolant jacket is selectively filled with a coolant and has an outer side and an inner side. The inner side of the jacket faces a length of the end portion and is separated from the length of the end portion by an air gap.

In some aspects, a coolant inlet delivers coolant to the coolant jacket. A coolant outlet may be used to allow the coolant to exit the coolant jacket.

In other examples, a DEF inlet provides DEF into the DEF valve. The DEF may be a reductant.

In some other examples, the air gap is effective to prevent the coolant from boiling under hot soak conditions. In other aspects, the air gap is effective to prevent the freezing of DEF through the valve body.

In others of these embodiments, an emission system in a vehicle includes an engine that creates an exhaust stream. A liquid cooled reduction unit (RDU) is provided and the unit includes a diesel exhaust fluid (DEF) injection valve. The valve has a valve housing that forms an elongated chamber therein, and the valve is configured to receive a DEF and force the DEF through the chamber to exit the chamber. The DEF is then directed and applied to the exhaust stream of a vehicle engine.

A coolant jacket is selectively filled with a coolant, and the coolant jacket has an outer side and an inner side. The inner side of the jacket faces a length of the valve body and is separated from the length of the valve body by an air gap.

An exhaust pipe receives the exhaust stream after the DEF has been injected to the stream. The injection of the DEF into the stream forms a modified exhaust stream that meets at least one government emission regulation.

Figure 1:
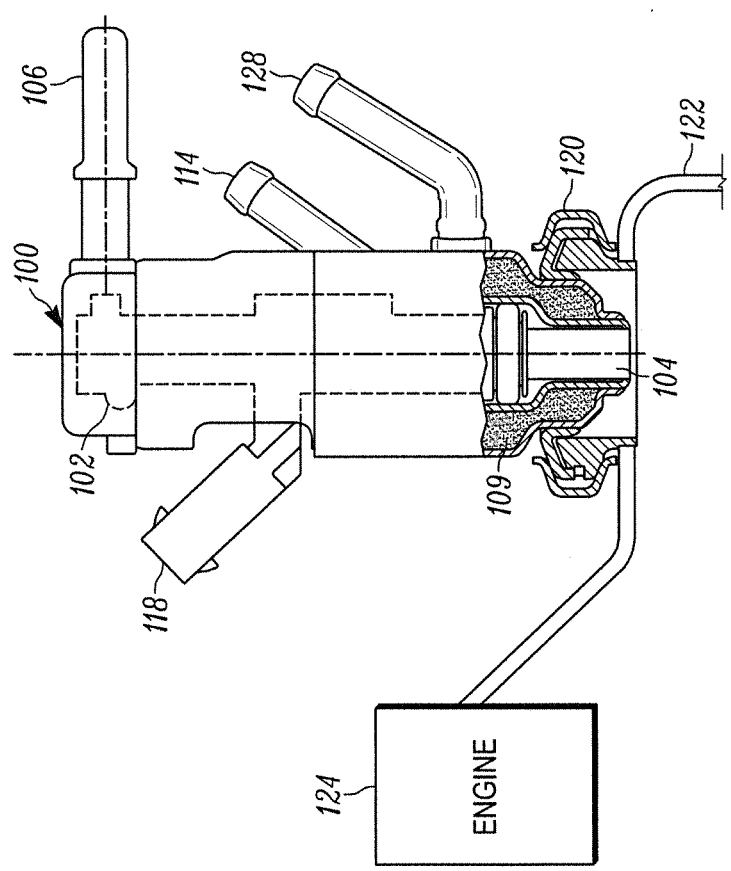
FIG. 1 comprises a block diagram of a liquid cooled SCR RDU mounted on an exhaust pipe according to various embodiments of the present invention.
Figure 3:
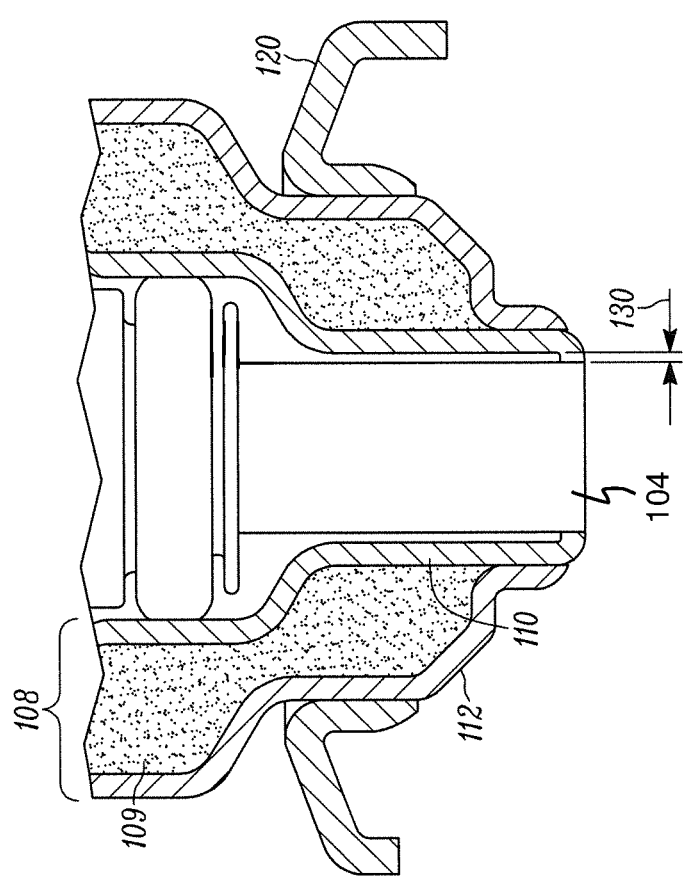
FIG. 3 comprises a close-up view of a coolant jacket/DEF injector interface showing an air gap between the inner coolant jacket and the DEF injector valve according to various embodiments of the present invention.

Referring now to FIG. 1, FIG. 2, and FIG. 3 one example of a liquid cooled SCR RDU 100 mounted on an exhaust pipe 122 is described. The RDU 100 includes a valve or DEF injector 102. The function of the valve or DEF injector 102 is to inject reductant (e.g., DEF) into the exhaust stream of an engine 124. The valve 102 has a an end portion 104 extending to a distal end 105. A DEF inlet 106 supplies DEF to the valve 102. A coolant jacket 108 surrounds the end portion 104.

The coolant jacket 108 includes an inner side 110 and an outer side 112. A coolant inlet 114 allows coolant 119 to flow into the coolant jacket 108. A DEF injector power connector 118 is used to provide power to the unit. A RDU flange, mounting boss, and clamp arrangement 120 couples the RDU to the exhaust pipe 122. The exhaust pipe 122 couples to the engine 124. An air gap 130 exists between the inner side 110 of the coolant jacket 108, and the end portion 104. In one example, the distance of the air gap 130 is approximately 0.3 mm. Other examples of separation distances are possible. A coolant inlet 126 allows coolant 109 into the jacket 108, while a coolant outlet 128 allows coolant 109 to exit.

The air gap 130 effectively decouples the valve 102 from the coolant jacket 108 and results in a non-intimate connection (non-touching connection) between these two elements. Advantageously, this configuration increases the injector's ability to resist boiling and freezing diesel exhaust fuel (DEF) by isolating the DEF injector 102 from the coolant jacket 108.

In one example of the operation of the system of FIGS. 1-3, the coolant jacket 108 is selectively filled with coolant 109. The inner side 110 of the jacket 108 faces a length of the end portion 104 and is separated from the length of the end portion 104 by the air gap 130. During normal operation of the liquid cooled RDU 100, the DEF injector 102 is isolated from the surrounding environment by the jacket 108 (which is supplied with engine coolant). The isolation provided by the air gap 130 is used to maintain DEF in a range below its atmospheric boiling and thermal decomposition point while in an environment much hotter than the atmospheric boiling point of DEF.

More specifically and during hot soak conditions, the DEF that passes through the valve 102 is not overheated. In other circumstances when the temperature is cold enough to cause the coolant temperature to be below the freezing point of the DEF within the coolant jacket 108, the non-intimate contact provided by the air gap 130 prevents the freezing of the DEF as it passes through the valve 102. These advantages as provided by the present approaches are discussed further below.

As mentioned, a hot soak condition might occur when the vehicle is turned off and no coolant is flowing through the jacket 108. During the hot soak, the heat of the exhaust system is conducted into the RDU 100 if the present approaches are not deployed. If no action were taken, during conditions where the vehicle is run at high load then turned off this hot soak could boil the coolant creating unrestricted temperatures within the RDU 100 and subsequent overtemping of DEF within the injector. When DEF is overtemped, it would form hard insoluble byproducts that negatively affect the performance of the DEF injector.

It will be appreciated that the present approaches use non-intimate contact between the injector 102 and coolant jacket 108 in the form of the air gap 130 to allow the injector 102 to stay isolated from the coolant jacket 108 during these temperature excursions. The air gap 130 between the inner water jacket surface and the outer surface of the end portion 104 significantly reduces injector temperature increases during hot soaks when compared to conventional close contact designs. Since the air gap 130 is used rather than some material, the costs and complexity of the present approaches are reduced compared to previous approaches.

Alternately, if the temperature is cold enough to cause coolant temperature to be below the freezing point of DEF within the coolant jacket 108, the non-intimate contact between the RDU 100 and DEF injector 102 is advantageous. DEF freezes at a higher temperature than the coolant 109, thus creating a situation where warmed urea could be frozen during its travel through a DEF injector 102 if intimate contact between the end portion 104 and the inner coolant jacket 108 existed and the coolant 109 was below the freezing point of DEF.

Figure 4:
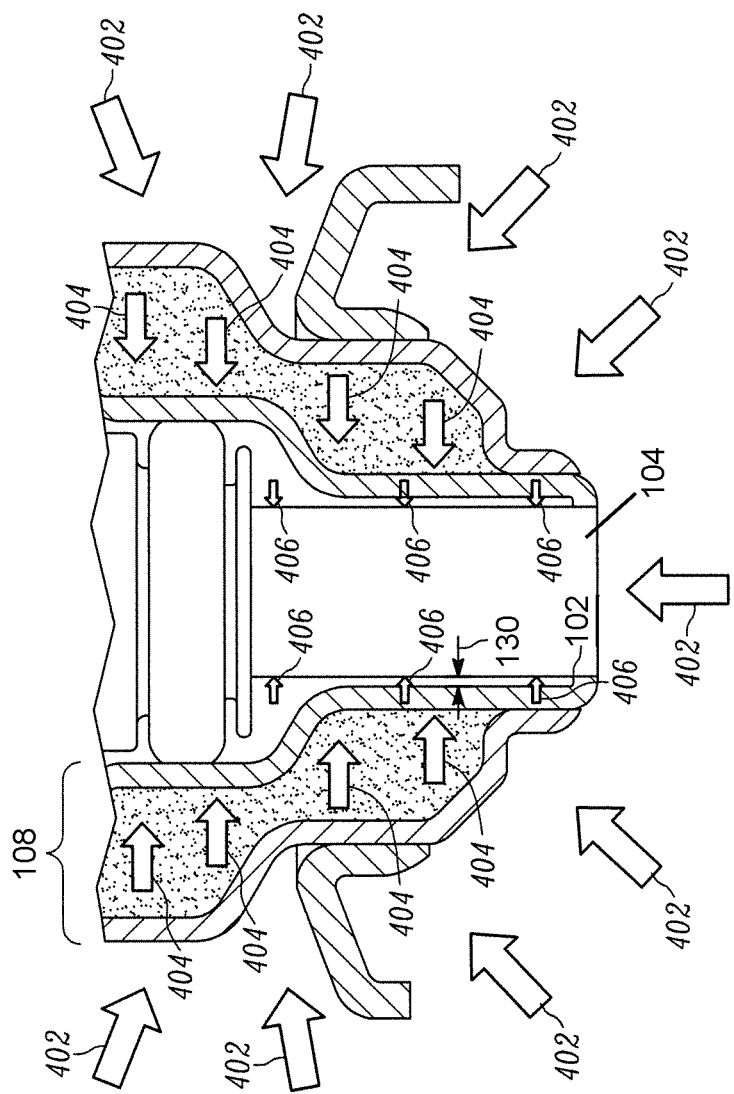
FIG. 4 comprises a block diagram of a liquid cooled SCR RDU and the thermal transfer characteristics present in the device according to various embodiments of the present invention.

Referring now to FIG. 4, examples of the thermal transfer characteristics of the system is described. The coolant jacket 108 extends around the valve 102 but is separated from the end portion 104 of the valve 102 by the air space 130.

The size of the arrows 402, 404, 406 reflects the amount of thermal transfer. It can be seen that relatively large arrows 402 extend from the rest of the vehicle to the arrangement of FIG. 4. These large arrows 402 represent a relatively large amount of thermal transfer from the vehicle and may originate, for example, from the engine 124 of the vehicle or the operation of any of the vehicle components to mention a few examples.

Medium arrows 404 from the exterior across through the coolant jacket 108. the coolant jacket 108 and its contents absorb some of the thermal energy represented by the arrows 402. It can also be seen that very small arrows 406 or no arrows across the air gap 430. The small arrow 406 (or no arrows) represent the effect that air gap has in the present arrangements. More specifically, the air gap 130 prevents (or significantly reduces) the transfer of thermal energy from the jacket 108 to the valve 102.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A liquid cooled reduction unit, the unit comprising:
    a diesel exhaust fluid (DEF) injection valve, the valve having an end portion extending to a distal end, the valve configured to receive a DEF and force the DEF to exit at the distal end, the DEF then being directed and applied to an exhaust stream of a vehicle engine; and
    a coolant jacket selectively filled with a coolant, the coolant jacket having an outer side and an inner side, the inner side of the jacket facing a length of the end portion and being separated from the length of the end portion by an air gap, the air gap being closed at or near the distal end of the valve such that the air gap is not in fluid communication with a DEF fluid exit path of the valve.

2. The unit of claim 1, further comprising a coolant inlet to deliver coolant to the coolant jacket.

3. The unit of claim 2, further comprising a coolant outlet to allow the coolant to exit the coolant jacket.

4. The unit of claim 1, further comprising a DEF inlet providing DEF into the DEF valve.

5. The unit of claim 1, wherein the DEF is a reductant.

6. The unit of claim 1, further comprising:
    exactly two fluid inlets, the two fluid inlets consisting of a DEF fluid inlet providing DEF to the valve and a coolant inlet providing coolant to the coolant jacket; and
    exactly two fluid outlets, the two fluid outlets consisting of a coolant outlet providing a coolant exit from the coolant jacket, and a DEF outlet disposed at the distal end of the valve to deliver the DEF into the exhaust stream of the vehicle.

7. An emission system in a vehicle:
an engine that creates an exhaust stream;
a liquid cooled reduction unit, the unit comprising:
- a diesel exhaust fluid (DEF) injection valve, the valve having an end portion extending to a distal end, the valve configured to receive a DEF and force the DEF to exit at the distal end, the DEF then being directed and applied to the exhaust stream of a vehicle engine; and
- a coolant jacket selectively filled with a coolant, the coolant jacket having an outer side and an inner side, the inner side of the jacket facing a length of the end portion and being separated from the length of the end portion by an air gap, the air gap being closed at or near the distal end of the valve such that the air gap is not in fluid communication with a DEF flow path exiting the valve; and
an exhaust pipe that receives the exhaust stream after the DEF has been injected to the stream, the injection of the DEF into the stream forming a modified exhaust stream that meets at least one government emission regulation.

8. The emission system of claim 7, further comprising a coolant inlet to deliver coolant to the coolant jacket.

9. The emission system of claim 8, further comprising a coolant outlet to allow the coolant to exit the coolant jacket.

10. The emission system of claim 7, further comprising a DEF inlet providing DEF into the DEF valve.

11. The emission system of claim 7, wherein the DEF is a reductant.

12. The emission system of claim 7, wherein the reduction unit has exactly two fluid inlets, the two fluid inlets consisting of a coolant inlet to deliver coolant to the coolant jacket and a DEF inlet providing DEF into the DEF valve.

13. The emission system of claim 7, wherein the reduction unit has exactly two fluid outlets, the two fluid outlets consisting of a coolant outlet to exit coolant from the coolant jacket and a DEF outlet at the distal end of the valve to deliver DEF into exhaust pipe.

14. The emission system of claim 7, wherein air in the air gap is unable to exit the reduction unit at or near the distal end of the valve.

* * * * *